(12) United States Patent
Pandurangan et al.

(10) Patent No.: US 8,423,929 B2
(45) Date of Patent: *Apr. 16, 2013

(54) INTELLIGENT ARCHITECTURE CREATOR

(75) Inventors: Anand Pandurangan, Sunnyvale, CA (US); Pius Ng, Hillsboro, OR (US); Siva Selvaraj, Sunnyvale, CA (US); Sanjay Banerjee, San Jose, CA (US); Ananth Durbha, San Jose, CA (US); Suresh Kadiyala, Cupertino, CA (US); Satish Padmanabhan, Sunnyvale, CA (US)

(73) Assignee: Algotochip Corp., Sunnyvale, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 12/906,857

(22) Filed: Oct. 18, 2010

(65) Prior Publication Data

US 2012/0096420 A1    Apr. 19, 2012

(51) Int. Cl.
 *G06F 17/50* (2006.01)
(52) U.S. Cl.
 USPC .......................................... 716/100; 716/101

(58) Field of Classification Search ........... 716/100–106
 See application file for complete search history.

(56) References Cited

U.S. PATENT DOCUMENTS

| | | | |
|---|---|---|---|
| 7,958,478 B2* | 6/2011 | Saito et al. ..................... | 716/113 |
| 7,984,412 B1* | 7/2011 | Schumacher et al. ........ | 716/136 |
| 2002/0144213 A1* | 10/2002 | Ramaswamy et al. ............ | 716/2 |

* cited by examiner

*Primary Examiner* — Binh Tat
(74) *Attorney, Agent, or Firm* — Tran & Associates

(57) ABSTRACT

Systems and methods are disclosed to automatically generate a processor architecture for a custom integrated circuit (IC) described by a computer readable code. The IC has one or more timing and hardware constraints. The system extracts parameters defining the processor architecture from a static profile and a dynamic profile of the computer readable code; iteratively optimizes the processor architecture by changing one or more parameters until all timing and hardware constraints expressed as a cost function are met; and synthesizes the generated processor architecture into a computer readable description of the custom integrated circuit for semiconductor fabrication.

19 Claims, 6 Drawing Sheets

INTELLIGENT ARCHITECTURE CREATOR

The present invention relates to a method for automatically generating an optimal architecture for a custom integrated circuit (IC) or an application-specific integrated circuit (ASIC).

BACKGROUND

Modern electronic appliances and industrial products rely on electronic devices such as standard and custom integrated circuits (ICs). An IC designed and manufactured for specific purposes is called an ASIC. The number of functions, which translates to transistors, included in each of those ICs has been rapidly growing year after year due to advances in semiconductor technology.

Normally the chip design process begins when algorithm designers specify all the functionality that the chip must perform. This is usually done in a language like C or Matlab. A team of chip specialists, tools engineers, verification engineers and firmware engineers then work many man-years to map the algorithm to a hardware chip and associated firmware. The team can use an off-the-shelf processor, which is proven but may have performance limitations because the standard architecture may not fit well with the algorithm.

The alternative is to design a custom architecture and custom hardware to achieve high performance for the desired algorithm. A computer architecture is a detailed specification of the computational, communication, and data storage elements (hardware) of a computer system, how those components interact (machine organization), and how they are controlled (instruction set). A machine's architecture determines which computations can be performed most efficiently, and which forms of data organization and program design will perform optimally.

The custom chip approach is a very expensive process and also fraught with risks from cost-overruns to technical problems. Developing cutting-edge custom IC designs introduces many issues that need to be resolved. Higher processing speeds have introduced conditions into the analog domain that were formerly purely digital in nature, such as multiple clock regions, increasingly complex clock multiplication and synchronization techniques, noise control, and high-speed I/O.

Another effect of increased design complexity is the additional number of production turns that may be needed to achieve a successful design. Yet another issue is the availability of skilled workers. The rapid growth in ASIC circuit design has coincided with a shortage of skilled IC engineers.

SUMMARY

In one aspect, systems and methods are disclosed to automatically generate a custom integrated circuit (IC) described by a computer readable code or model. The IC has one or more timing and hardware constraints. The system extracts parameters defining the processor architecture from a static profile and a dynamic profile of the computer readable code; iteratively optimizes the processor architecture by changing one or more parameters until all timing and hardware constraints expressed as a cost function are met; and synthesizes the generated processor architecture into a computer readable description of the custom integrated circuit for semiconductor fabrication.

Implementations of the above aspects may include one or more of the following. The system can optimize processor scalarity and instruction grouping rules. The system can also optimize the number of cores needed and automatically splits the instruction stream to use the cores effectively. The processor architecture optimization includes changing an instruction set. The system's changing an instruction set includes reducing the number of instructions required and encoding the instructions to improve instruction access, decode speed and instruction memory size requirements The processor architecture optimization includes changing one of: a register file port, port width, and number of ports to data memory. The processor architecture optimization includes changing one of: data memory size, data cache pre-fetch policy, data cache policy Instruction memory size, instruction cache pre-fetch policy and instruction cache policy. The processor architecture optimization includes adding a co-processor. The system can automatically generate a new instruction uniquely customized to the computer readable code to improve performance of the processor architecture. The system includes pre-processing the computer readable code by determining a memory location for each pointer variable; and inserting an instrumentation for each line. The system includes parsing the computer readable code, and further includes removing dummy assignments; removing redundant loop operations; identifying required memory bandwidth; replacing one or more software implemented flags as one or more hardware flags; and reusing expired variables. The extracting parameters further includes determining an execution cycle time for each line; determining an execution clock cycle count for each line; determining clock cycle count for one or more bins; generating an operator statistic table; generating statistics for each function; and sorting lines by descending order of execution count. The system can mold commonly used instructions into one or more groups and generating a custom instruction for each group to improve performance (instruction molding). The system includes checking for a molding violation in the new instruction candidate. A cost function can be used to select an instruction molding candidate (IMC). IMCs can be based on statistical dependence. The system can determine timing and area costs for the architecture parameter change. Sequences in the program that could be replaced with the IMCs are identified. This includes the ability to rearrange instructions within a sequence to maximize the fit without compromising the functionality of the code. The system can track pointer marching and building statistics regarding stride and memory access patterns and memory dependency to optimize cache pre-fetching and a cache policy.

The system also includes performing static profiling of the computer readable code and/or dynamic profiling of the computer readable code. A system chip specification is designed based on the profiles of the computer readable code. The chip specification can be further optimized incrementally based on static and dynamic profiling of the computer readable code. The computer readable code can be compiled into optimal assembly code, which is linked to generate firmware for the selected architecture. A simulator can perform cycle accurate simulation of the firmware. The system can perform dynamic profiling of the firmware. The method includes optimizing the chip specification further based on profiled firmware or based on the assembly code. The system can automatically generate register transfer level (RTL) code for the designed chip specification. The system can also perform synthesis of the RTL code to fabricate silicon.

Advantages of the preferred embodiments may include one or more of the following. The system automates the evaluation process so that all costs are taken into consideration and system designer gets the best possible number representation and bit width candidates to evaluate. The method can evaluate the area, timing and power cost of a given architecture in a quick and automated fashion. This methodology is used as a cost computing engine. The method enables the synthesis of the DSP automatically based on the algorithm in an optimal fashion. The system designer does not need to be aware of the hardware area, delay and power cost associated with the choice of a particular representation over another one. The system allows hardware area, delay and power to be modeled as accurately as possible at the algorithm evaluation stage.

Other advantages of the preferred embodiments of the system may include one or more of the following. The system alleviates the problems of chip design and makes it a simple process. The embodiments shift the focus of product development process back from the hardware implementation process back to product specification and computer readable code or algorithm design. Instead of being tied down to specific hardware choices, the computer readable code or algorithm can be implemented on a processor that is optimized specifically for that application. The preferred embodiment generates an optimized processor automatically along with all the associated software tools and firmware applications. This process can be done in a matter of days instead of years as is conventional. The described automatic system removes the risk and makes chip design an automatic process so that the algorithm designers themselves can directly make the hardware chip without any chip design knowledge since the primary input to the system is the computer readable code, model or algorithm specification rather than low level primitives.

Yet other benefits of using the system may include
1) Speed: If chip design cycles become measured in weeks instead of years, the companies using the system can penetrate rapidly changing markets by bringing their products quickly to the market.
2) Cost: The numerous engineers that are usually needed to be employed to implement chips are made redundant. This brings about tremendous cost savings to the companies using the instant system.
3) Optimality: The chips designed using the instant system product have superior performance, area and power consumption.

The instant system is a complete shift in paradigm in methodology used in design of systems that have a digital chip component to it. The system is a completely automated software product that generates digital hardware from algorithms described in C/Matlab. The system uses a unique approach to the process of taking a high level language such as C or Matlab to realizable hardware chip. In a nutshell, it makes chip design a completely automated software process.

DESCRIPTION

Figure 1:
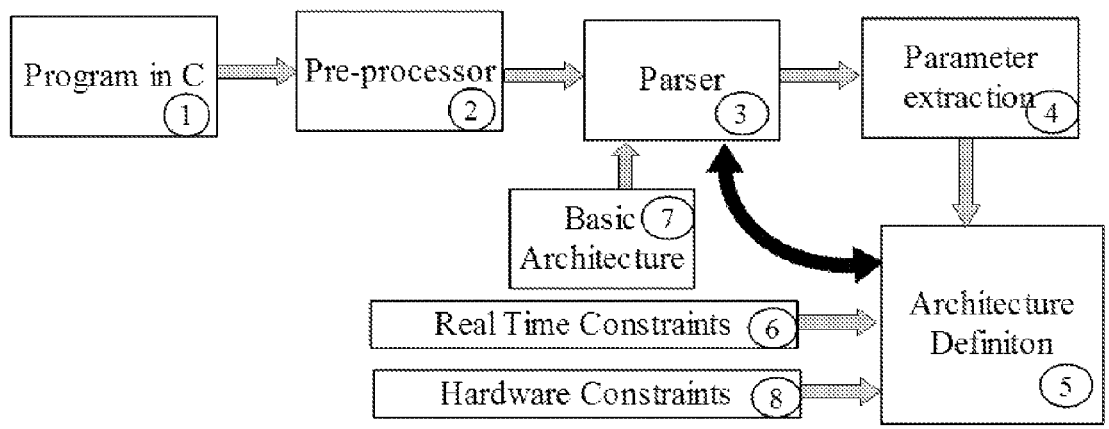
FIG. 1 shows an exemplary system to automatically generate an architecture for a custom IC or ASIC device whose functionality is specified by a program, code or computer model.

FIG. 1 shows an exemplary system to automatically determine the best architecture for a custom IC or ASIC device whose functionality is specified by a program, code or computer model. Different stages involved in obtaining architecture definition for a given computer readable code or program (1) provided as input. In one embodiment, the program is written in the C-language, but other languages such as Matlab, Python, or Java can be used as well. In a pre-processor (2), the input program (1) is formatted before such program is analyzed by a parser (3). In the formatting process, functionality of the program (1) is preserved. The parser (3) initially uses a basic architecture to extract all the information and creates a database. The system then collects static and dynamic profiles of the program. From the output of the parser (3), parameters required for the architecture definition (5) is extracted by a parameter extractor (4). With these parameters and the real time and hardware constraints to be met by the program (1) as inputs, the system iteratively determines the most suitable architecture at the given stage for the given C-program. The architecture is used to parse the C-program and parameter extraction. A new architecture is defined again. This loop continues until the best architecture which gives the best time, area and power performance, is defined.

Figure 2:
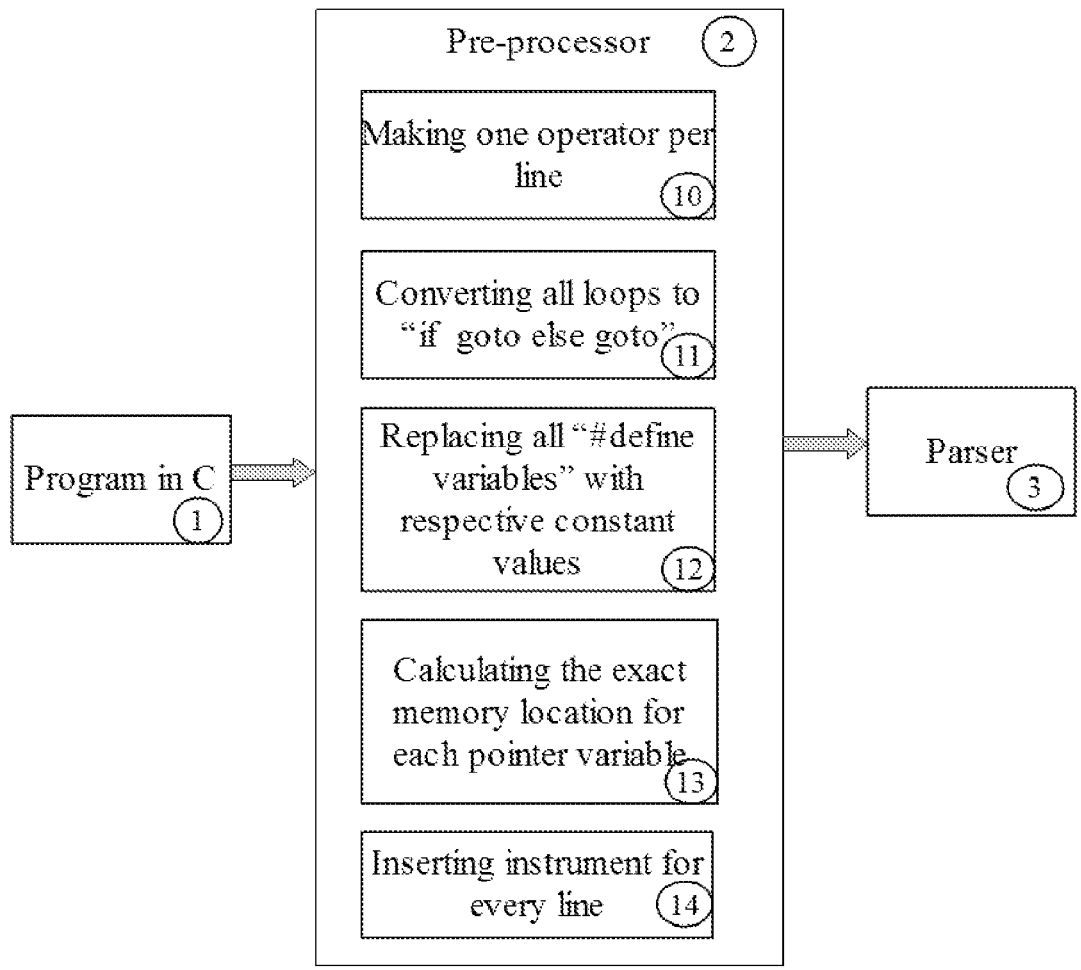
FIG. 2 shows in more details an exemplary preprocessor used in FIG. 1.

FIG. 2 shows in more details an exemplary preprocessor used in FIG. 1. The preprocessor (2) receives the program (1) and converts the program into code with only one operator per line (10). Loops in the program also are converted into the form "if . . . goto . . . else goto . . . " (11). Next, the system replaces occurrences of the directive "# define variable" with their respective constant values (12). The system determines the memory location for each pointer variable (13), and inserts instrumentation for each line (14). Next, exemplary illustrations of the operations of FIG. 2 to exemplary C-programs will be discussed.

In (10), multiple operators line in the C-program is formatted to have one operator per line (10). Thus, the exemplary code

```
int a,b,c,d;
d = d + (a *b) /c;
is changed to
    int D1182;
    int D1183;
    int a;
    int b;
    int c;
    int d;
    D1182 = a * b;
    D1183 = D1182 / c;
    d = D1183 + d;
```

In (11), the "if goto else goto" conversion converts the exemplary code

```
nt i,a;
for(i=1;i<10;i++)
a+=10;
to
int i;
int a;
```

-continued

```
    i = 1 ;
    goto D1181 ;
    D1180: ;
    a = a + 10 ;
    i = i + 1 ;
    D1181: ;
    if (i <= 9)
    {
        goto D1180 ;
    }
    else
    {
        goto D1182 ;
    }
    D1182: ;
```

In the replacement of "#define" variables with respective constant values (12), the exemplary code

```
#define data 10
main( )
{
int i,a;
if(i<data)
i=i+data;
else
i=0;
}
is converted to
main ( )
{
int i;
int a;
if (i <= 9)
    {
        i = i + 10;
    }
else
    {
        i = 0;
    }
}
```

In (13), the exact memory location for each pointer variable depending upon its data type is calculated. Thus, the following exemplary code

```
int *a;
char *d;
*a=10;
a++;
d=a;
*d='c';
d++;
*d='b';
is converted to
int * a;
char * d;
*a = 10;
a = a + 4;
d = (char *) a;
*d = 99;
d = d + 1;
*d = 98;
```

In (14), the process inserts instrumentation for every line to get the dynamic profile of the C program. For example, the code

```
    D1458 = *sig_out;
    D1459 = (int) D1458 ;
is instrumented with "printf" function insertion as follows:
    D1458 = *sig_out;
    printf("0\t");
    printf("0x%x\n", (unsigned int) D1458 );
    D1459 = (int) D1458 ;
    printf("1\t");
    printf("0x%x\n", (unsigned int) D1459 );
```

Figure 3:
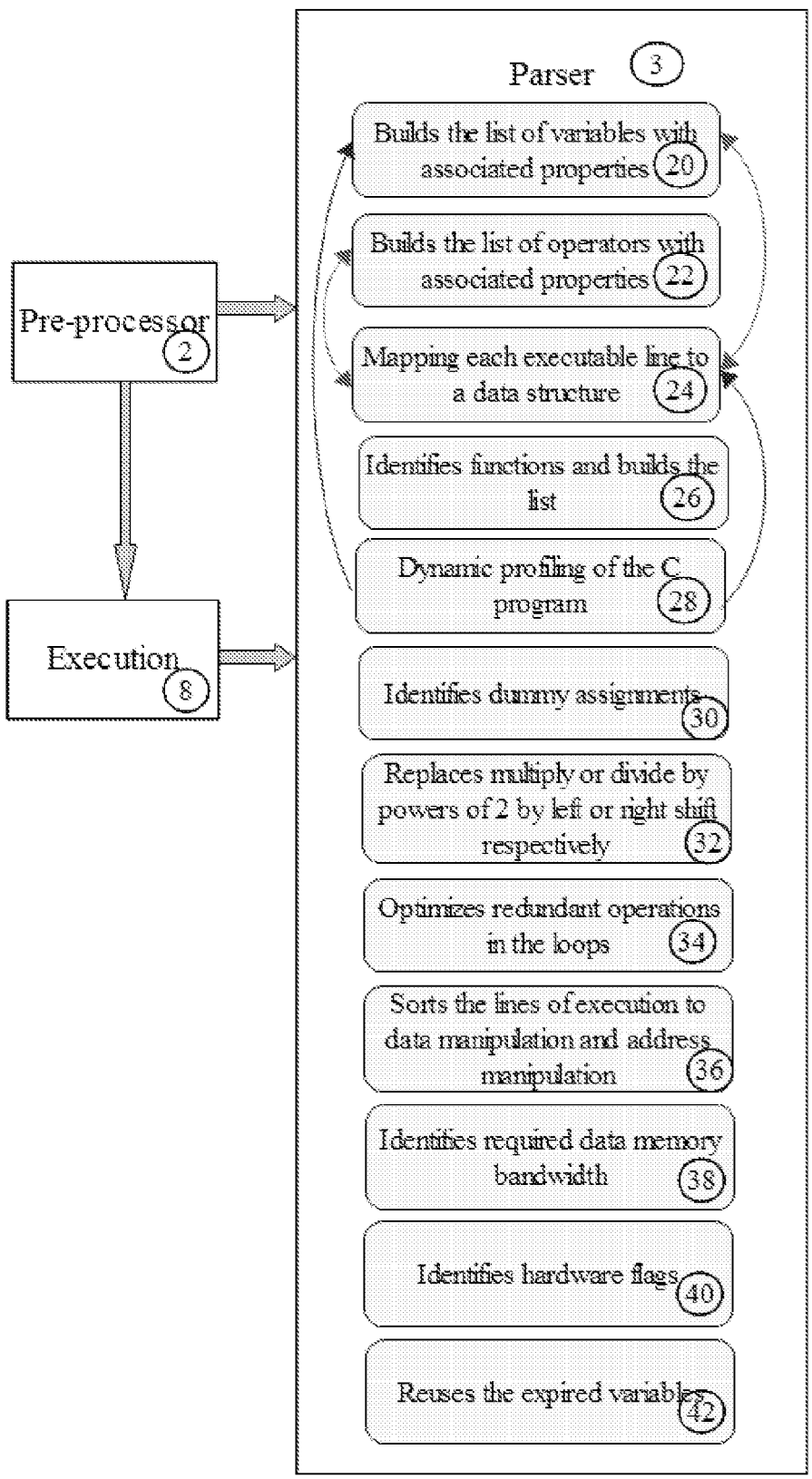
FIG. 3 shows in more details an exemplary parser used in FIG. 1.

FIG. 3 shows in more details an exemplary parser used in FIG. 1. In one embodiment, the formatted C program from the pre-processor (2) is executed and the results of the execution are logged. The execution covers a variety of use case scenarios and is a thorough test suite. An incomplete test suite could lead to improper architecture definition. The formatted C program and the logged results are fed as input to the parser (3). In one implementation, the parser (3) performs the following operations:

In (20), the process builds a list of all variables used in the program (1). Each variable has associated properties that identify the variable uniquely. Some of the properties are information related to data type, whether the variable is an array or pointer.

In (22), the process builds a list of all operators used in the program. Each operator is also given a set of properties that describe the function of the operator. The properties are defined so that complex operators can be defined as a combination of the simple operators defined in the Basic Architecture (7).

In (24), the lines of executable code in the program are mapped into a data structure. All information about the lines is available in the data structure. This structure links into the variable list and operator list. Any line is uniquely identified by the variables and operators used in the line.

In (26), functions are identified and a list of functions is maintained.

In (28), the logged results from the execution of the C program are parsed and all relevant dynamic information is gathered. This is used to update the variable list and data structure of lines of code.

In (30), the C program could contain many lines that might be optimized by the compiler. For example, unnecessary assignments would be removed by the compiler. Such lines that could be potentially removed by the compiler are identified and marked as "dummy" lines. The algorithm to perform this is described in a separate section below.

In (32), the system optimizes any multiplication by a power of 2 to a left shift and any division by a power of 2 to a right shift (considering only positive powers). All lines that have multiplication or division operators by powers of 2 are replaced with right or left shifts. This ensures in the correct identification of statistics associated with the execution of the program.

In (34), the process optimizes redundant operations in loops. It is possible that some other form of optimization with regard to loops can be implemented by compilers. An algorithm is used to track such lines of code and duplicate the same optimization in the line data structure that has been created. This algorithm is also explained in a separate section below.

In (36), the lines of execution are now separated into two primary bins for architecture classification namely data manipulation and address manipulation. This is a very critical distinction to be arrived at since it would drive some significant architecture decisions. Any program that has lots of address manipulation operations would benefit from a separate address manipulation unit while such a hardware would be an overkill for other applications. The algorithm to do this is defined in a separate section below.

In (38), the process identifies required data memory bandwidth. One critical architecture decision pertains to the data memory bandwidth necessary to run the program. All lines that are dependent on data loaded from memory are marked under a different bin for this purpose. All lines that operated on data other than being loaded from memory—for example it could operate on the result of a line that operated on data loaded from memory—are marked separately. An algorithm is applied on this data to calculate the number of ports and the width of the ports to the data memory that would be required to facilitate the execution of the lines of C program with minimal stall.

In (40), hardware flags are identified and processed. The native C program does not have a concept of hardware flags. Flags are typically coded as global variables. However, from a performance standpoint, it is imperative to identify all the hardware flags needed for the program. This is usually done by hand now. Either the C code is hand coded again in assembly to take advantage of hardware flags (and the resulting performance win) or the compiler is manually tweaked so that some type of coding structure with pragmas could be used to represent a flag. Neither of the options are easy or scalable. Our application has an algorithm that identifies potential Hardware flags in the native C code and marks these global variables a flags. As part of the architecture definition, the hardware needed to represent these flags is also described and synthesized automatically. The algorithm to identify the flags is described in in more details below.

In (42), the process looks for expired variables that can be reused. In order to extract faithful parameters, it is important to consider the number of variables used for each line and the number of read and write ports available in the register file. In case of a mismatch, penalty cycles have to be added. However native C program is not written to optimize the number of variables used. So using the program as such could result in a unrealistic number of penalty cycles. So the data structure of lines has to be parsed and modified to minimize the use of new variables. This algorithm is described in a separate section below.

The dummy line identification is detailed next. The dummy assignment check identifies lines in the C program that contain assignments that are likely to be optimized out by the compiler. In one embodiment, the process includes code to perform the following:

1) March through the data structure of lines looking for lines with assignment statement.

2) When a assignment statement is hit, the left hand side variable and right hand side variables are marked.

3) The lines further down are investigated to verify if this assignment is necessary or if the right hand side variable could have been directly used instead. Any reassignment of the right hand side variable in any line prior to the last line where the left hand side variable is referred to would directly break this requirement.

4) However, there could be other cases (such as in conditional checks) where even if the requirement in 3 is fulfilled, the assignment is still necessary. A logic that understands the branch conditions and branch depth is used to make this decision.

5) If after all these checks, it is identified that the assignment need not have been made, the line containing the assignment operation is marked as a dummy line.

Next, dummy variable reassignment is discussed. Once a assignment line is marked as dummy, the variable assignment in that line has become redundant. So the following pseudo-code reassigns variables in order to ensure consistency of the data structure of lines:

1) Identify the right hand side variable of the dummy assignment line.

2) Identify the previous line in which this variable occurred on the left hand side.

3) Replace that left hand side variable with the left hand side variable of the dummy line. A check of branch depth has already been performed in the dummy assignment check section. So this replacement will be consistent.

Next, loop optimization is discussed. The process tracks possible optimizations that compilers are likely to perform on accessing and indexing of arrays within loops. An example is given below.

Consider the line of C code (base is a int *)

$b=*(base+i);$

When this line of C code is sent through the preprocessor, the resulting lines may be generated:

$temp1=i*4;$ $temp2=base+temp1;$ $b=*temp2;$

When this operation is performed inside a tight loop, the first line is redundant. In any loop, the next address can be easily calculated by adding 4 to the previous address. Such lines in the program are tracked and marked as dummy. If this is not done, the architecture definition would be unfairly skewed to account for operations that would never exist when the code is actually compiled for the machine. So it is essential to be able to identify all such redundant operations before proceeding to the architecture definition stage. Pseudo-code for loop optimization is as follows:

1) Track all variable values through iterations of execution. This information is available from the parsing of the logged results of the C program due to the instrumentation inserted in 14.

2) Compare the current value of the variable to the previous value of the variable and store this as the difference value.

3) If the difference value remains unchanged through all iterations of execution and the line of code actually happens to be within a loop (loops have been already identified), then this is a candidate for the optimization. If the operator on the line happens to be a multiply, then this line is marked as dummy.

Next, an identification of data and address manipulations is discussed. The process splits the lines of execution in the C program into data and address manipulation bins. While there is no difference between these operations from a programming point of view—they are just arithmetic operations on variables—there is significant difference from a processor architecture point of view. A data manipulation operation is likely to rely on a previous address manipulation operation to fetch the data from memory. For a variety of reasons this differentiation is very important. To identify address and data manipulation operations, the system performs the following pseudo-code:

1) Walk through the lines of code identifying all lines that operate on pointers (declared either as pointers or arrays in the C program).

2) Mark lines as address manipulation operations.

3) Ensure results are only for fetching data from memory.

Operation 3 is done as the marked lines could either lead to or could be dependent on other lines of code. These lines are tracked to ensure that the results of these lines are meant only for the purpose of fetching data from the memory. To implement this, the variables involved in these lines are tracked and the process makes sure that these variable values (without another independent reassignment) are not used for any other purpose. If this is the case, these lines are also marked as address manipulation operations. Any line that supplies data to both address and data manipulation operations is classified as data manipulation operation.

Flag identification is discussed next. The flag detection algorithm walks through all the global variables declared in the C program using the following pseudo-code:
1) Each global variable is checked for the possible values taken during the course of execution.
2) If the only values taken are 0 and 1, then proceed to the next step.
3) Check all lines where the values are set. The values can be set only through an immediate operation (in other words an explicit assignment such as x=1) to proceed to the next stage. If it is derived as a result of assignment of another variable (such as x=y), the right hand side variable is back tracked to see if that variable confirms to this rule. There is a logic in place to prevent a perpetual lock up situation. If there any other operation (such as arithmetic, logical or memory fetch), the variable cannot be a flag.
4) Check actual assignment lines. The assignment can only be to one of the values (0 or 1) in the general flow. Assignment to the other value can happen only within a conditional check flow.
5) Mark variable that fits the above rules as a Flag.
6) A hardware flag corresponding to this definition is specified in the processor architecture and will be automatically synthesized.
7) All lines that set the values of this variable are marked as flag manipulation lines.
8) The architecture definition also creates instructions that enable these operations.
9) All these lines that are marked as flag manipulation lines would use these newly defined instructions rather than standard instructions so that they refer to specific hardware flags.

Next, variable reuse is discussed. The process to minimize the number of variables used in each line is as follows:
1) At each line (that has not been marked dummy), mark the left hand side variable and right hand side variables.
2) If any of the right hand side variables are not referred to in any of the subsequent lines, then that variable is used to replace the existing left hand side variable.
3) All lines that refer to the left hand side variable in the lines below are changed to refer to the variable that has replaced it.
4) In all of the process above, the algorithm limits the search scope to the zone where the left hand side variable is not re-assigned.

Once the parser phase is completed, the data structure of lines is revisited by a parameter extraction module or parameter extractor (4).

Figure 4:
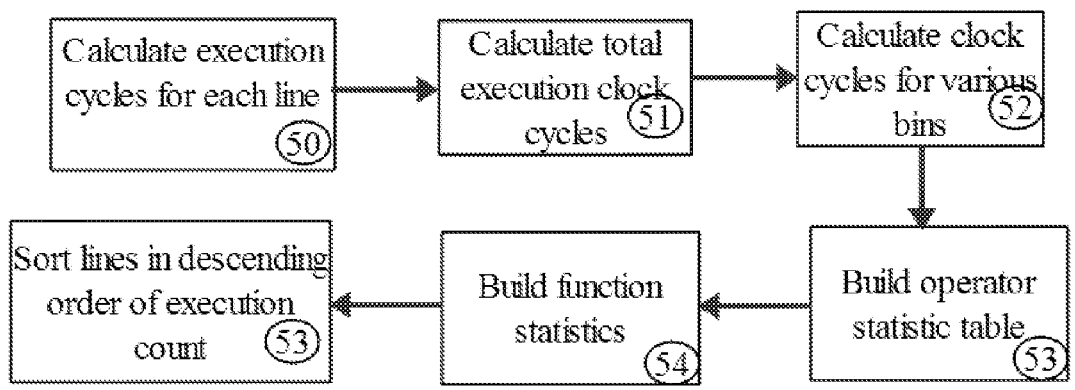
FIG. 4 shows in more details an exemplary parameter extraction module in FIG. 1.

FIG. 4 shows in more details the exemplary parameter extraction module (4). A variety of relevant parameters are extracted by walking through this data structure. For example, the total cycles needed to execute the program for the given test case is calculated. This is performed by noting the number of clock cycles needed to execute any given line (value derived from the property of the operator used in that line) and adding any clock cycle penalty suffered by the line due to data dependency or other reasons and multiplying this value by the number of times the line was executed (value known by parsing the logged results of the execution of the C program). This operation is repeated for every line and the total clock cycles needed for the execution of the entire test case is arrived at. Similarly, the number of clock cycles associated with address calculation, memory load, memory store, conditional branches, loops and data manipulation are arrived at. A list is built that tags the operator distribution for all of the above calculations. For example, in case of the total cycles, how many of these are associated with which operator is calculated. Additionally, for each operator, the distribution of usage across different data widths is also calculated. At the end of this process, a table is generated, such as the exemplary table below:

| Data Type | 8 bit | 16 bit | 32 bit | 64 bit |
|---|---|---|---|---|
| IF | 0 | 1227671 | 1985699 | 2251196 |
| CASE | 0 | 0 | 0 | 0 |
| ADD | 4 | 1584710 | 1101631 | 906162 |
| SUB | 0 | 598708 | 400 | 185602 |
| MUL | 0 | 1452303 | 0 | 0 |
| DIV | 0 | 0 | 0 | 0 |
| LEFT_SHIFT | 0 | 108314 | 32931 | 1301594 |
| RIGHT_SIFT | 0 | 8235 | 10504 | 193194 |
| MOVE_IMMEDIATE | 0 | 45878 | 3230 | 15127 |
| FUNCTION_CALL | 0 | 792741 | 3207890 | 0 |
| MOVE | 0 | 100092 | 1720 | 212810 |
| MODULO | 0 | 0 | 0 | 0 |
| AND | 0 | 7398 | 640 | 183780 |
| OR | 0 | 200 | 0 | 74822 |
| NOT | 0 | 3287 | 10504 | 7218 |
| XOR | 0 | 210 | 0 | 1705735 |
| CHECK | 0 | 4028 | 1544 | 7944 |
| FLAG_MAN | 0 | 1 | 337065 | 0 |
| GOTO | 0 | 0 | 0 | 0 |
| MEM_LOAD | 4 | 1890207 | 93545 | 9760 |
| MEM_STORE | 0 | 215484 | 4400 | 1600 |

Similarly statistics about function calls is also built. For each function call, the number of times it is called and the clock cycle spent on executing the function are calculated. The lines of code are then sorted in the descending order of execution count.

The definition of the architecture that best suits the needs of the C program is given as input of an iterative process. The first time parameter extraction is run, the process calculates statistics using the base architecture defined in 7. In addition to the output of parameter extraction, real time constraints associated with the C program and the hardware constraints associated with the product are also fed as input to the architecture definition block. The block automatically generates an architecture that would meet the performance requirement specified. This architecture can then be refined using an architecture optimizer to arrive at the optimal architecture. The first step in this stage is to meet the real time constraints. The goal of this step is to define new instructions and corresponding processor architecture that would reduce the total execution time and enable the processor to meet the real time constraints. In one exemplary implementation, the following operations are performed:
1. The process retrieves list of lines sorted by the execution count is available from the previous section. March along these lines and identify groups of lines that occur in sequence. For example the sorted list may look like 651, 652, 659, 802, 803, . . . . In this case lines 651 through 659 are identified for the first group. In marking lines as part of a single group, they should have the same number of execution count. In the example, it is important that 651, 652 and 659 have the same number of execution count (the number of times these lines were counted in the parsing of the logged results of the C program execution). Then all lines between the first and last line of this list is marked as a group.

2. These groups of lines have a high execution count and therefore consume a substantial amount of execution time. If these lines could be amortized into a single instruction, it might result in reducing the execution time. A new instruction is created by molding these instructions into one. Any such candidate for molding is called Instruction Molding Candidate (IMC).

3. Each group of instructions is checked for molding violations. For example an unconditional GOTO (Jump) or a function call in the middle of this group would invalidate the sequence. There are other constraints such as a group of lines needing more data variables than accessible from the register file. For example, if the current architecture assumes a 2 read port register file and the group of instructions need three variables to form a new instruction, it is not possible to form a IMC using this group. If there is only one write port to the register file and the group of instructions writes out two variables, it is again not possible to form an IMC from this group. So the system checks for hardware related architecture constraints and locates a sub-group (if it exists) that conforms to these conditions.

4. Within this sub-group, it is possible to form multiple IMCs. For example, we could have a sequence of lines as listed below forming a sub-group.

$a=b+c;$ $d=a*2;$ $e=d \text{ AND } b;$

In this case, we have one IMC that consists of all three operations, another that only contains the first two instructions and another that contains the last two instructions. All such possible IMCs are formed.

5. The group of lines from which the IMC has been defined is one place in the program where these instructions occur in sequence. It is possible that such sequences could exist in other places in the C program. This is now investigated. It is important to note that the condition to be met is not only the sequence of instructions, but also the relative operator dependency. Take the example described in point 4. If we come across another place in the code where we find the sequence $x=y+z;$ $r=x*2;$ $f=r \text{ AND } x;$ then this could not be counted as a place where the IMC can be used. So the algorithm not only checks for the same sequence of instructions, but also the same variable dependency structure. All such places where the IMC can possibly be used is tagged along with the IMC.

6. The result of point 5 is used to calculate the potential reduction is execution cycle count of the program if this IMC were to be actually used as a new instruction.

7. At this point, the algorithm queries a hardware synthesizer block to get the timing and area for implementing this IMC as an instruction.

8. The process is repeated for all lines.

9. Some of these IMC potentially replace full functions. In that case, the program flow would change significantly when these IMCs are implemented as instructions. So they are marked as special IMCs.

10. At this point the list of all possible IMCs for the current stage has been arrived at. An optimization cost function is used to pick the IMCs that need to get implemented as instructions. The algorithm is not tied to a specific cost function although the likely cost functions would be the ones that consider the timing of the new instruction and how it impacts the execution time of the C program. Calculating the impact on execution time is a non-trivial task. Any IMC that has a a timing which is less than the current clock cycle time does not impact the architecture significantly. However, we are likely to encounter IMCs who have a timing that is greater than the current clock cycle. If these IMCs are accepted, the clock cycle time would increase for all instructions and could possibly increase the execution time although the number of clock cycles could be less. Hence this calculation and decision is non-trivial.

11. In order to perform this calculation, IMCs are grouped together into dependent groups. In order to perform this grouping, the principle of complete statistical independence is applied. Any IMCs that are not completely statistically independent are grouped together. This is a rather conservative approach, but one that is needed nevertheless. Grouping helps in preventing double counting. Whenever a decision regarding increasing the cycle time has to be made, all the AMC groups are investigated to find out IMCs that might benefit from this increase in cycle time (i.e., they also have timing which is greater than the current cycle time but is lower than the new cycle time). The best IMC (one that reduces the cycle count the most) is picked from each group that stands to benefit. Using this information the new execution time is calculated and if this is lesser than the current execution time, the cycle time is increased.

12. Each time the cost function identifies a IMC, the corresponding instruction is defined and the architecture definition is altered to accommodate this new instruction. The effect of this new instruction on other IMCs is investigated and the IMCs are rationalized.

13. Once the cost function cannot find any IMCs that fit the requirement, the process is halted.

14. The architecture is passed as input to the parser. Parameters are extracted again and the architecture definition is revisited. This loop runs until the cost function cannot find any new IMCs that fit the requirement.

15. If the real time constraints are still not met, some other architecture variables are considered. For example the number of read and write ports to register file, the number of read and write ports to memory, the width of these ports, scalarity of the processor and instruction grouping rules to optimally use the hardware and such. These are variables that are not strictly related instructions, but are essential to finding new IMCs that could further help in reducing the execution time. The loop is again repeated. As an example, let us consider scalarity. The algorithm marches through the data structure of lines and identifies the amount of instruction level parallelism inherent in the code. This is used to optimize the hardware resource available for the execute unit of the processor and define the scalarity of the processor. The available hardware for the execute unit is also used to define the instruction grouping rules as well. It is important to note that the grouping rules arrived at in this case are optimal for the code presented and not arbitrarily chosen. A cost function to minimize idle slots is used to define this.

16. If the real time constraints are still not met by increasing any of the above mentioned architecture variables, then the algorithm identifies macro parallelism and optimizes the number of cores necessary for the identified parallelism. The algorithm also splits the instruction stream to be executed in each of the cores.
17. At any point of time, if the real time performance constraints are met, the algorithm exits the loop.
18. If the performance constraints are not met even after all variables have been looked at, the algorithm identifies this application not fit for a programmable solution and recommends a co-processor architecture where some of the functionality is implemented as a data path dedicated hardware. The list of IMCs synthesized and IMCs rejected (since the timing was greater than the current cycle time) is used to define this co-processor architecture.

Another algorithm tracks the marching of pointers and builds statistics regarding the stride and memory access patterns. These statistics in addition to the information attained about memory dependency are used to optimize cache pre-fetch mechanism and cache policy.

Once the real time performance constraints have been met, other hardware constraints are visited. The hardware constraints can be represented in terms of area, power and some other parameters. The algorithm then fine tunes the architecture to reduce redundant paths and non-critical sections to meet these constraints. Another algorithm is employed to check all the instructions available and verify the benefit provided by these instructions. A cost function is used to perform this check. All instructions that can be safely removed without impacting the real time performance constraints are removed from the set so that instruction decoding time is reduced to the minimal level. These constraints may or may not be met. They are used so that the architecture defined is not a big overkill for a given application and any scope for reducing the complexity of the architecture is investigated.

Figure 5:
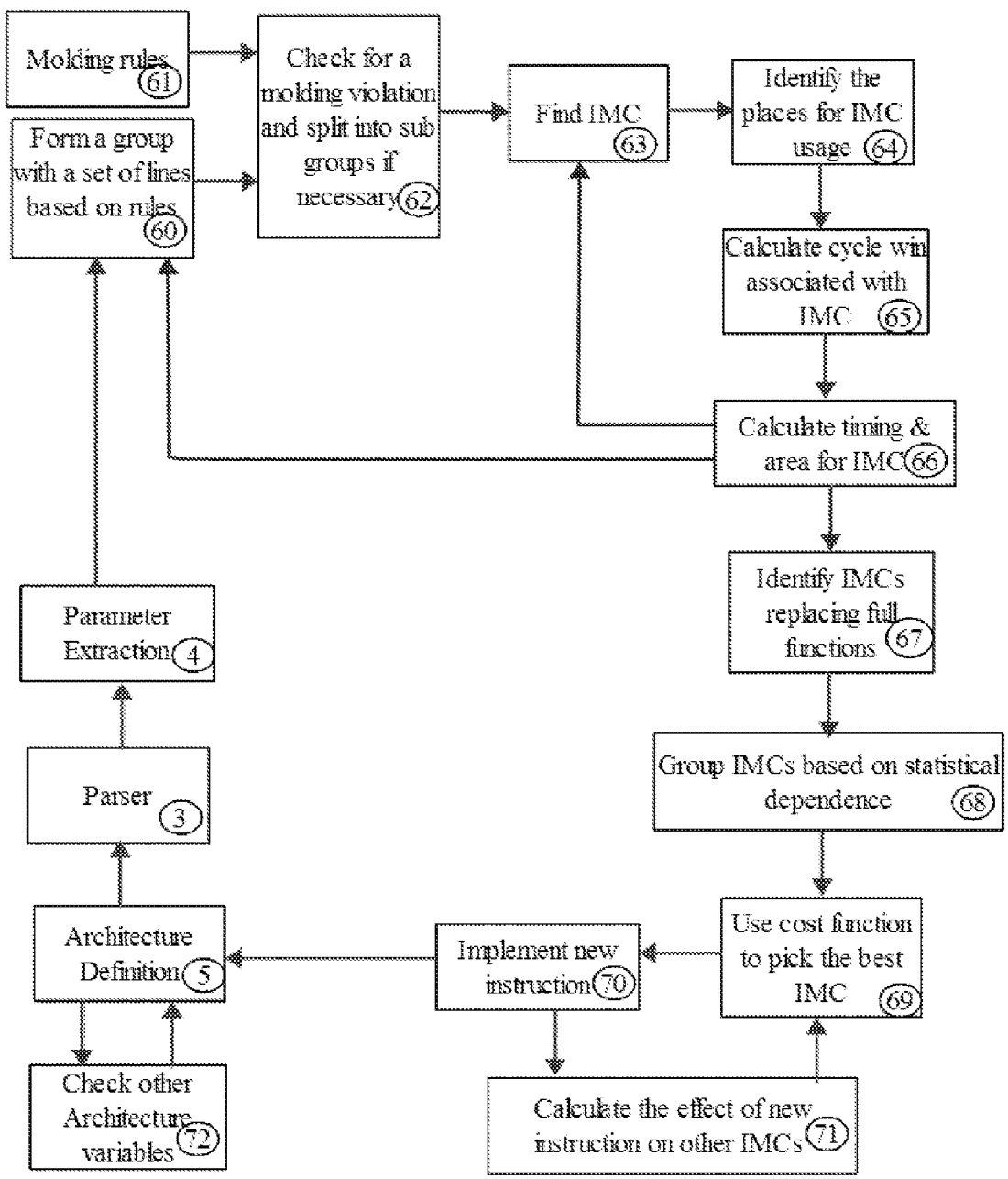
FIG. 5 shows an exemplary process to iteratively generate an optimal architecture for a custom hardware solution from a computer program.

FIG. 5 shows an exemplary system to automatically generate architecture definition. In this process, output from parser (3) is provided to the parameter extraction module (4) as previously discussed. Next, the process forms a group with a set of program lines based on predetermined rules (60). Next, a set of molding rules are retrieved (61). The process checks for molding rule violations and splits the program lines into sub-groups (62). The process finds the IMCs (63) and identifies places for IMC usage (64). Next, the process determines cycles associated with each IMC (65). Timing and area determinations are also performed for the IMCs (66). The information is fed back to operations 60 and 63 and also provided to identify IMCs that can replace full functions (67). Next, the IMCs are grouped based on statistical dependence (68). The process uses cost functions to pick the best IMC (69) and implements a new instruction for the best IMC (70). An iterative determination of effects of new instruction on other IMCs is done (71), and the determination is provided to operation 69 to pick the best IMC and operation 70 to implement new instructions. This is done until a threshold is reached and the new instruction is added to the architecture definition (5). The process checks the impact of the new instruction on other architecture variables (72) and accepts or rejects the new instruction. The process is then repeated until a predetermined threshold is reached that meets the constraints placed on the custom IC.

Figure 6:
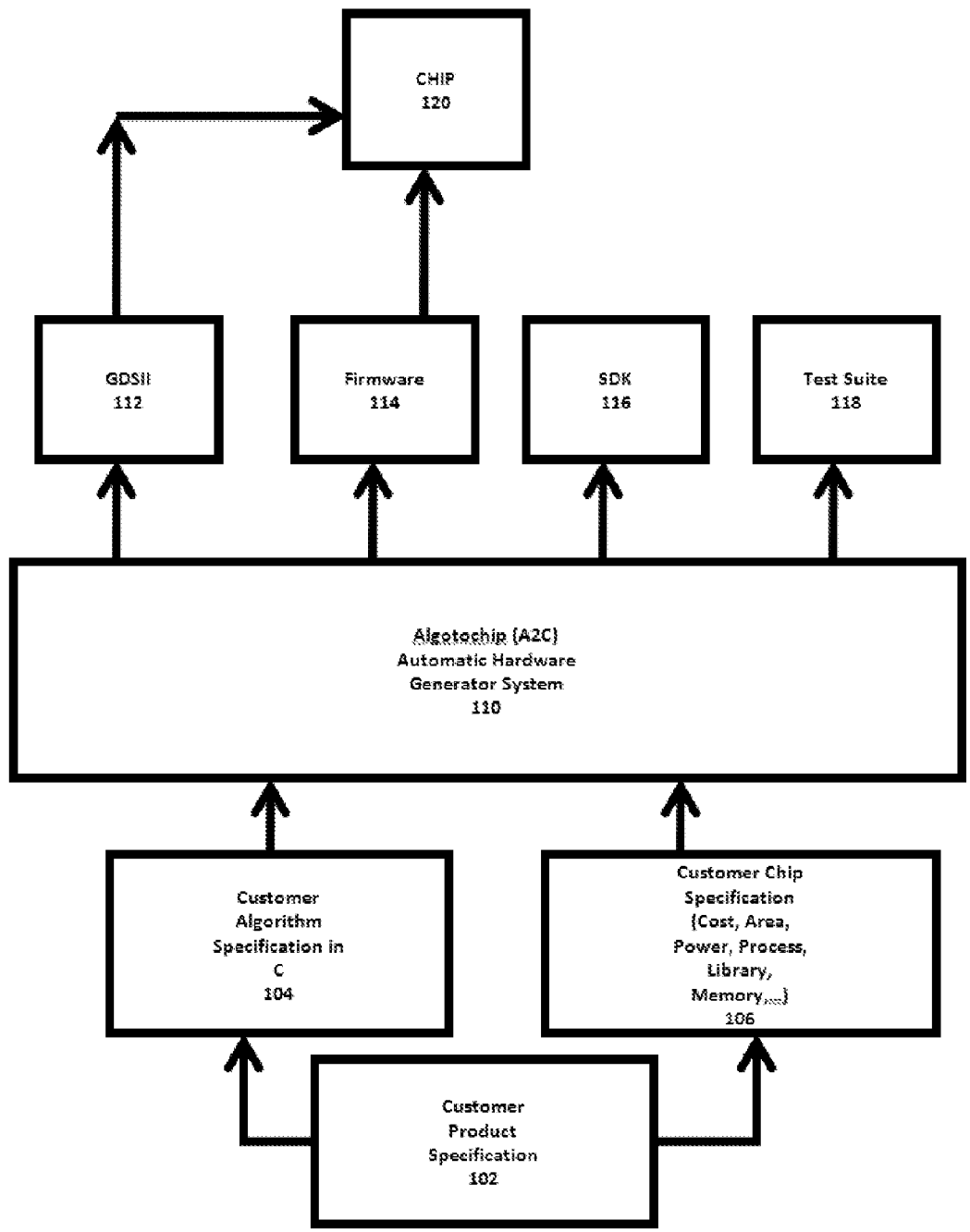
FIG. 6 shows an exemplary system to automatically generate a custom IC with the architecture defined in FIG. 5.

FIG. 6 shows an exemplary system to automatically generate a custom IC. The system of FIG. 6 supports an automatic generation of an architecture for a custom hardware solution for the chosen target application. The target application specification is usually done through algorithm expressed as computer readable code in a high-level language like C, Matlab, SystemC, Fortran, Ada, or any other language. The specification includes the description of the target application and also one or more constraints such as the desired cost, area, power, speed, performance and other attributes of the hardware solution.

In FIG. 6, an IC customer generates a product specification 102. Typically there is an initial product specification that captures all the main functionality of a desired product. From the product, algorithm experts identify the computer readable code or algorithms that are needed for the product. Some of these algorithms might be available as IP from third parties or from standard development committees. Some of them have to be developed as part of the product development. In this manner, the product specification 102 is further detailed in a computer readable code or algorithm 104 that can be expressed as a program such as C program or a math model such as a Mathlab model, among others. The product specification 102 also contains requirements 106 such as cost, area, power, process type, library, and memory type, among others.

The computer readable code or algorithm 104 and requirement 106 are provided to an automated IC generator 110. Based only on the code or algorithm 104 and the constraints placed on the chip design, the IC generator 110 automatically generates with few or no human involvement an output that includes a GDS file 112, firmware 114 to run the IC, a software development kit (SDK) 116, and/or a test suite 118. The GDS file 112 and firmware 114 are used to fabricate a custom chip 120.

The instant system alleviates the issues of chip design and makes it a simple process. The system shifts the focus of product development process back from the hardware implementation process back to product specification and algorithm design. Instead of being tied down to specific hardware choices, the algorithm can always be implemented on a processor that is optimized specifically for that application. The system generates this optimized processor automatically along with all the associated software tools and firmware applications. This whole process can be done in a matter of days instead of years that it takes now. In a nutshell the system makes the digital chip design portion of the product development in to a black box.

In one embodiment, the instant system product can take as input the following:
  Computer readable code or algorithm defined in C/Matlab
  Peripherals required
  Area Target
  Power Target
  Margin Target (how much overhead to build in for future firmware updates and increases in complexity)
  Process Choice
  Standard Cell library Choice
  Testability scan The output of the system may be a digital hard macro along with all the associated firmware. A software development kit (SDK) optimized for the digital hard macro is also automatically generated so that future upgrades to firmware are implemented without having to change the processor.

The system performs automatic generation of the complete and optimal hardware solution for any chosen target application. While the common target applications are in the embedded applications space they are not necessarily restricted to that.

By way of example, a computer to support the automated chip design system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to automatically generate a processor architecture for a custom integrated circuit (IC) described by a computer readable code, the IC having at least one or more timing and hardware constraints, comprising:
   a. extracting parameters defining the processor architecture from a static profile and a dynamic profile of the computer readable code;
   b. iteratively optimizing the processor architecture by changing one or more parameters until all timing and hardware constraints expressed as a cost function are met and a compiler-in-the-loop to compile, assemble and link code for each processor architecture iteration to arrive at a customized architecture with an application specific instruction set wherein the processor architecture optimization comprises changing an instruction set, including reducing the number of instructions required and encoding the instructions to improve instruction access and decode speed, and to improve instruction memory size requirement; and
   c. synthesizing the generated processor architecture into a computer readable description of the custom integrated circuit for semiconductor fabrication; and
   d. fabricating the custom integrated circuit.

2. The method of claim 1, comprising optimizing processor scalarity and instruction grouping rules 3. The method of claim 1, comprising optimizing the number of processor cores needed and automatically splitting an instruction stream to use the processor cores effectively.

4. The method of claim 1, wherein the processor architecture optimization comprises changing one of: a register file port, port width, and number of ports to data memory.

5. The method of claim 1, wherein the processor architecture optimization comprises changing one of: data memory size, data cache pre-fetch policy, data cache policy instruction memory size, instruction cache pre-fetch policy, and instruction cache policy.

6. The method of claim 1, wherein the processor architecture optimization comprises adding a co-processor.

7. The method of claim 1, comprising pre-processing the computer readable code by:
   a. determining a memory location for each pointer variable; and
   b. inserting an instrumentation for each line.

8. The method of claim 1, comprising changing the processor instruction set by automatically generating new instructions uniquely customized to the computer readable code to improve performance of the processor architecture, further including:
   a. removing dummy assignments;
   b. removing redundant loop operations;
   c. identifying required memory bandwidth;
   d. replacing one or more software implemented flags as one or more hardware flags; and
   e. reusing expired variables.

9. The method of claim 1, wherein extracting parameters further comprises:
   a. determining an execution cycle time for each line;
   b. determining an execution clock cycle count for each line;
   c. determining clock cycle count for one or more bins;
   d. generating an operator statistic table;
   e. generating statistics for each function; and
   f. sorting lines by descending order of execution count.

10. The method of claim 1, comprising molding commonly used instructions into one or more groups and generating a custom instruction for each group to improve performance (instruction molding).

11. The method of claim 10, comprising checking for a molding violation in the new instruction candidate.

12. The method of claim 10, comprising applying a cost function to select an instruction molding candidate (IMC).

13. The method of claim 10, comprising grouping instruction molding candidates (IMCs) based on statistical dependence.

14. The method of claim 1, comprising determining timing and area costs for the architecture parameter change.

15. The method of claim 1, comprising identifying sequences in the program to be replaced with by one or more instruction molding candidates (IMCs) and rearranging instructions within a sequence to maximize IMC usage while retaining code functionality.

16. The method of claim 1, comprising passing information regarding candidate code to use a newly synthesized instruction to a compiler.

17. The method of claim 1, comprising tracking pointer marching and building statistics regarding stride and memory access patterns and memory dependency to optimize cache pre-fetching and a cache policy.

18. A system to automatically generate a custom integrated circuit (IC) described by a computer readable code or model, the IC having at least a floating point parameter, a performance constraint, and a static range and a dynamic range for an input signal, comprising: hardware processor and memory;
   a. extracting parameters defining the processor architecture from a static profile and a dynamic profile of the computer readable code;
   b. iteratively optimizing the processor architecture by changing one or more parameters to meet all timing and hardware constraints and a compiler- in-the-loop to compile, assemble and link code for each processor architecture iteration to arrive at a customized architecture with an application specific instruction set, wherein the processor architecture optimization comprises changing an instruction set, including reducing the number of instructions required and encoding the instructions to improve instruction access and decode speed, and to improve instruction memory size requirement.
   c. synthesizing the generated processor architecture into a computer readable description of the custom integrated circuit for semiconductor fabrication; and
   d. a fabrication facility to custom manufacture the IC.

19. The system of claim 18, comprising
   a. molding commonly used instructions into one or more groups and generating a custom instruction for each group to improve performance (instruction molding);
   b. checking for a molding violation in the new instruction candidate;
   c. applying a cost function to select an instruction molding candidate (IMC) and means for grouping IMCs based on statistical dependence.

* * * * *